J. L. Janeway
Gate
No. 75276 — Patented March 10, 1868
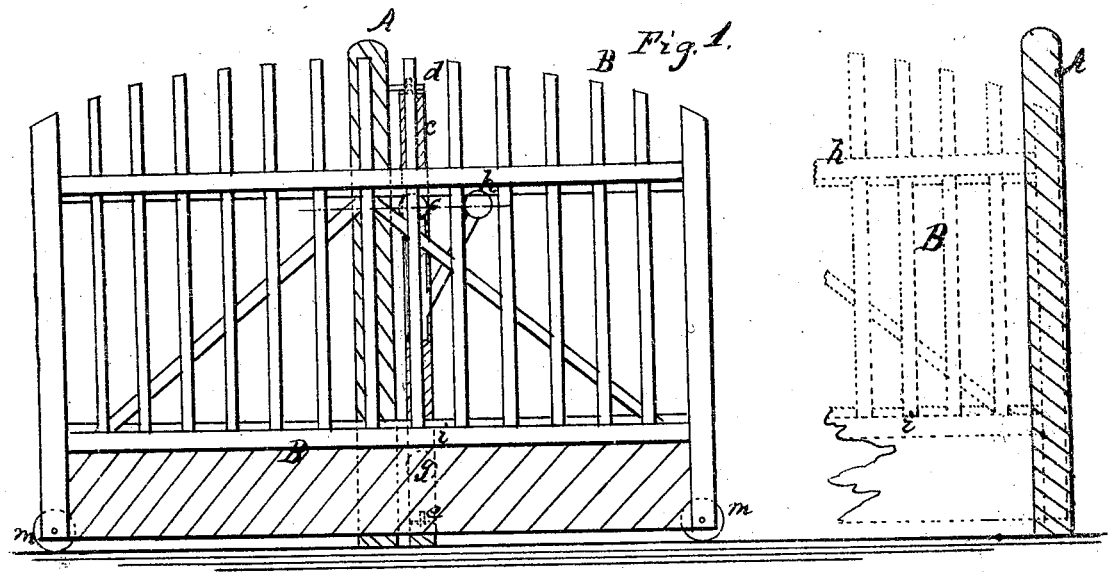
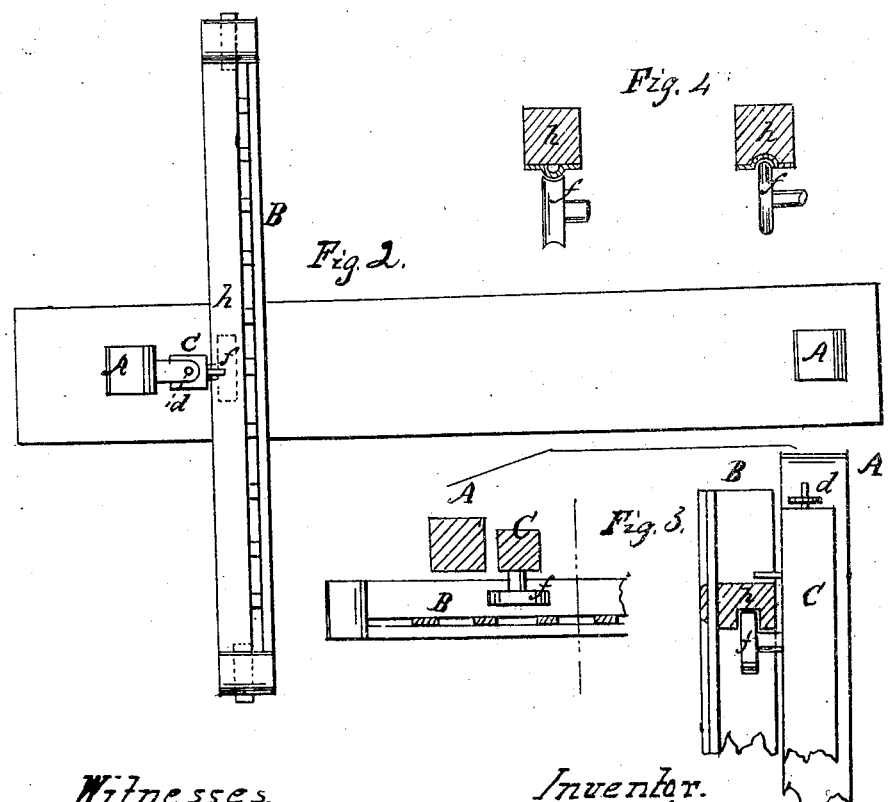
Witnesses.
F. Scott
Edward Lyon Jr.
Inventor.
J. L. Janeway
By atty
J. N. McIntire

United States Patent Office.

JOHN L. JANEWAY, OF FLEMINGTON, NEW JERSEY.

Letters Patent No. 75,276, dated March 10, 1868.

IMPROVEMENT IN GATES.

*The Schedule referred to in these Letters Patent and making part of the same.*

TO ALL WHOM IT MAY CONCERN:

Be it known that I, JOHN L. JANEWAY, of Flemington, Hunterdon county, in the State of New Jersey, have invented certain new and useful "Improvements in Gates;" and I do hereby declare that the following is a full and exact description thereof, reference being had to the accompanying drawings, making part of this application.

My invention relates to certain new and useful improvements in ornamental gates for gardens.

Previous to my invention, it has been customary, in hanging the gates of paling and other ornamental fences, to arrange them to swing on hinges, and, where the gateway was intended for a carriage to pass, the gate has generally been made in two parts, because of the tendency of a broad gate to sag and get out of place, and even where narrow gates have been so hung on hinges, they have been found to be very liable to get out of order. Numerous improvements have been suggested and patented to overcome these difficulties in farm-gates, which are formed of rails running horizontally, among which may be found a plan or mode of operation which I propose to adopt in my improved ornamental gate, viz, that of so arranging and constructing the gate and its appendages that it can be slid along horizontally, until its weight becomes about balanced on the supporting-points, and then be turned or swivelled as upon pivots or hinges.

My invention consists in the combined arrangement of an ornamental gate with the swivelling or turning-device and posts, in such manner that the gate may be slid along horizontally and then turned round, all as hereinafter more fully explained.

To enable those skilled in the art to make and use my improvements, I will proceed to describe more fully the construction and operation of one of my improved gates, referring by letters to the accompanying drawings, in which—

Figure 1 is a front elevation, showing the gate partially open, (and closed in red lines.)

Figure 2 is a top view of the same, with the gate entirely open.

Figure 3 is a horizontal section at $x\, x$, fig. 1; and

Figure 4 are detail views, showing construction of bearing-rails and swivelling-pulleys.

In the several figures the same parts are denoted by the same letters of reference.

A A are the side posts of the gateway, and B is the gate, which may be made of the design shown, or any other ornamental pattern; C is a vertical swivel-bar, which may be pivoted at $d\, e$, as shown, or otherwise so arranged as to turn freely on its vertical axis. On this bar C are arranged two (or more) wheels, or small rotatory disks, $f\, g$, in such a manner as to turn freely on their axes, and so located as to be in contact at their peripheries with the lower faces of the horizontal braces or rail-bars $h\, i$ of the gate, and to support or sustain partially the weight of the latter. At the lower portion of the gate are arranged two or more caster-wheels $m\, m$, which turn freely on their pivots, and bear upon the ground or (if deemed expedient to use one) the sill of the gateway.

The operation of my improved gate may be thus explained: Supposing the gate to be closed, by pushing the gate in the direction indicated by the arrow, fig. 1, it may be slid back until it will about balance on the pivoted rolls $f\, g$, as shown at fig. 1, when it may be swivelled or swung round into the position seen at fig. 2, in which latter movement the gate $c$, disks $f\, g$, and bar C all turn together on the pivots $d\, e$. It will be seen that, by making the gate and its appendages as described, and arranging the whole to operate as set forth, the gate may be made light and strong enough, without any danger of derangement or liability of sagging or straining of the hinge portions or devices.

In lieu of making the rails $h\, i$ simply grooved on their lower faces to accommodate the peripheries or bearing-surfaces of the disks, they may be provided with metallic ways, as shown at fig. 4, and the rotatory disks may be adapted, as shown, to said ways. By making such "ways," the gate may be made to run easier, and the whole apparatus be rendered more efficient and durable. Where there is no sill to the gateway, and the caster-wheels $m\, m$ run on the ground, they should be made sufficiently large, and be so hung in the gate as to insure the free running of the gate over any irregularities of the ground's surface.

I am aware that farm-gates have been so constructed and arranged as to slide and then turn, as, for instance, as described and shown in Letters Patent granted to Elijah Kemper, June 24, 1862. I do not, therefore, wish to be understood as making my claim of invention to cover this method of construction or mode of operation. I am not aware, however, that, previous to my invention, any adaptation of this mode of operation in farm-gates has been made to paling or ornamental gates.

What I therefore claim as new, and desire to secure by Letters Patent, is—

The continued arrangement of an ornamental or garden-gate B with the stationary posts A A, swivel-bar C, pivoted disks $f g$, and caster-rolls $m m$, the whole constructed and operating as described for the purposes set forth.

In testimony whereof, I have hereunto set my hand and seal, this 31st day of December, 1867.

JNO. L. JANEWAY. [L. S.]

Witnesses:
    WM. H. BISHOP,
    J. N. McINTIRE.